(12) United States Patent
Raichman et al.

(10) Patent No.: US 8,591,302 B2
(45) Date of Patent: Nov. 26, 2013

(54) SYSTEMS AND METHODS FOR COMMUNICATION

(75) Inventors: Yossef Raichman, Herzlia (IL); Moshe Cohen, Tel-Aviv (IL)

(73) Assignee: In-Dot Ltd., Tel-Aviv (IL)

( * ) Notice: Subject to any disclaimer, the term of this patent is extended or adjusted under 35 U.S.C. 154(b) by 274 days.

(21) Appl. No.: 12/920,465

(22) PCT Filed: Mar. 11, 2009

(86) PCT No.: PCT/IL2009/000275
§ 371 (c)(1),
(2), (4) Date: Sep. 1, 2010

(87) PCT Pub. No.: WO2009/113067
PCT Pub. Date: Sep. 17, 2009

(65) Prior Publication Data
US 2011/0009175 A1    Jan. 13, 2011

Related U.S. Application Data

(60) Provisional application No. 61/064,542, filed on Mar. 11, 2008.

(51) Int. Cl.
*G06F 15/16* (2006.01)
(52) U.S. Cl.
USPC ............... 463/1; 434/169; 434/307; 446/268; 446/99; 273/288
(58) Field of Classification Search
None
See application file for complete search history.

(56) References Cited

U.S. PATENT DOCUMENTS

| 3,910,701 A | 10/1975 | Henderson et al. |
| 4,540,176 A | 9/1985 | Baer |
| 4,604,065 A | 8/1986 | Frazer et al. |
| 4,608,601 A | 8/1986 | Shreck et al. |
| 4,729,564 A | 3/1988 | Kuna et al. |
| 4,917,500 A | 4/1990 | Lugos |
| 5,059,126 A | 10/1991 | Kimball |
| 5,190,285 A | 3/1993 | Levy et al. |
| 5,196,683 A | 3/1993 | Marom et al. |
| 5,260,553 A | 11/1993 | Rockstein et al. |
| 5,303,037 A | 4/1994 | Taranowski |

(Continued)

FOREIGN PATENT DOCUMENTS

| EP | 0094502 | 11/1983 |
| FR | 2885251 | 11/2006 |

(Continued)

OTHER PUBLICATIONS

Official Action Dated Jul. 5, 2012 From the US Patent and Trademark Office Re. U.S. Appl. No. 12/867,259.

(Continued)

*Primary Examiner* — Paul A D'Agostino

(57) ABSTRACT

The present invention relates to a method for using a toy for communicating with a client terminal. The method comprises encoding at least one interacting information as at least one flickering control instruction and using a toy element having a light emitting unit for emitting light according to the at least one flickering control instruction, thereby transmitting the interacting information to a client terminal. The client terminal is configured for capturing the emitted light using an image capturing device and decoding the at least one interacting information therefrom.

16 Claims, 6 Drawing Sheets

(56) References Cited

U.S. PATENT DOCUMENTS

| | | | |
|---|---|---|---|
| 5,314,336 A | 5/1994 | Diamond et al. | |
| 5,569,902 A | 10/1996 | Wood et al. | |
| 5,574,804 A | 11/1996 | Olschafskie et al. | |
| 5,736,410 A | 4/1998 | Zarling et al. | |
| 5,795,213 A | 8/1998 | Goodwin | |
| 5,853,327 A | 12/1998 | Gilboa | |
| 5,912,454 A | 6/1999 | Castillo et al. | |
| 5,945,656 A | 8/1999 | Lemelson et al. | |
| 6,048,209 A | 4/2000 | Bailey | |
| 6,064,421 A * | 5/2000 | Pohl | 348/14.01 |
| 6,089,943 A | 7/2000 | Lo | |
| 6,091,513 A | 7/2000 | Ishihara et al. | |
| 6,249,348 B1 | 6/2001 | Jung et al. | |
| 6,290,565 B1 * | 9/2001 | Galyean, III et al. | 446/99 |
| 6,319,010 B1 * | 11/2001 | Kikinis | 434/169 |
| 6,330,427 B1 | 12/2001 | Tabachnik | |
| 6,354,502 B1 | 3/2002 | Hagstrom et al. | |
| 6,377,249 B1 | 4/2002 | Mumford | |
| 6,392,214 B1 | 5/2002 | Okamoto | |
| 6,551,165 B2 * | 4/2003 | Smirnov | 446/175 |
| 6,574,425 B1 | 6/2003 | Weiss et al. | |
| 6,773,344 B1 * | 8/2004 | Gabai et al. | 463/1 |
| 6,835,131 B1 | 12/2004 | White et al. | |
| 6,905,391 B2 | 6/2005 | Soto et al. | |
| 7,044,429 B1 | 5/2006 | Foreman et al. | |
| 7,062,073 B1 * | 6/2006 | Tumey et al. | 382/118 |
| 7,261,612 B1 | 8/2007 | Hannigan et al. | |
| 7,338,377 B2 | 3/2008 | Shinoda | |
| 7,369,261 B2 | 5/2008 | Silverbrook et al. | |
| 7,397,464 B1 | 7/2008 | Robbins et al. | |
| 7,645,178 B1 * | 1/2010 | Trotto et al. | 446/268 |
| 7,883,420 B2 * | 2/2011 | Bradbury et al. | 463/43 |
| 8,055,899 B2 | 11/2011 | Levy et al. | |
| 2001/0030748 A1 | 10/2001 | Jung et al. | |
| 2002/0008145 A1 | 1/2002 | Walsh et al. | |
| 2002/0022523 A1 * | 2/2002 | Dan et al. | 463/42 |
| 2002/0049833 A1 * | 4/2002 | Kikinis | 709/219 |
| 2002/0097400 A1 | 7/2002 | Jung et al. | |
| 2003/0003839 A1 | 1/2003 | Lin | |
| 2003/0056869 A1 | 3/2003 | Tate et al. | |
| 2003/0227628 A1 | 12/2003 | Kreimer et al. | |
| 2004/0214642 A1 | 10/2004 | Beck | |
| 2005/0073722 A1 | 4/2005 | Silverbrook et al. | |
| 2005/0082369 A1 | 4/2005 | Benedetti | |
| 2005/0106547 A1 | 5/2005 | Chiu | |
| 2005/0121524 A1 | 6/2005 | Silverbrook et al. | |
| 2005/0125228 A1 | 6/2005 | Samuels | |
| 2005/0146615 A1 | 7/2005 | Silverbrook et al. | |
| 2005/0151966 A1 | 7/2005 | Packirisamy et al. | |
| 2006/0223637 A1 * | 10/2006 | Rosenberg | 463/47 |
| 2007/0108287 A1 | 5/2007 | Davis et al. | |
| 2007/0117602 A1 | 5/2007 | Madigou et al. | |
| 2007/0229859 A1 | 10/2007 | Lapstun et al. | |
| 2007/0296552 A1 | 12/2007 | Huang et al. | |
| 2008/0003043 A1 | 1/2008 | Fukui et al. | |
| 2008/0048396 A1 * | 2/2008 | Andersen | 273/288 |
| 2009/0005167 A1 * | 1/2009 | Arrasvuori et al. | 463/40 |
| 2009/0197658 A1 | 8/2009 | Polchin | |
| 2010/0044441 A1 | 2/2010 | Cohen et al. | |
| 2010/0157396 A1 | 6/2010 | Kim et al. | |
| 2010/0219251 A1 | 9/2010 | Decoux et al. | |
| 2011/0027770 A1 | 2/2011 | Cohen et al. | |
| 2011/0310617 A1 | 12/2011 | Cornelissen et al. | |

FOREIGN PATENT DOCUMENTS

| | | |
|---|---|---|
| GB | 2133951 | 8/1984 |
| GB | 2186415 | 8/1987 |
| JP | 2005-034442 | 2/2005 |
| KR | 2001-0093468 | 10/2001 |
| WO | WO 99/46581 | 9/1999 |
| WO | WO 00/15316 | 3/2000 |
| WO | WO 00/79504 | 12/2000 |
| WO | WO 02/07841 | 1/2002 |
| WO | WO 2005/029697 | 3/2005 |
| WO | WO 2006/058204 | 6/2006 |
| WO | WO 2007/124469 | 11/2007 |
| WO | WO 2008/011054 | 1/2008 |
| WO | WO 2008/11054 | 1/2008 |
| WO | WO 2008/111054 | 9/2008 |
| WO | WO 2008/111055 | 9/2008 |
| WO | WO 2009/101610 | 8/2009 |
| WO | WO 2009/113067 | 9/2009 |
| WO | WO 2009/125393 | 10/2009 |

OTHER PUBLICATIONS

Communication Relating to the Results of the Partial International Search Dated Apr. 12, 2010 From the Interantional Searching Authority Re.: Application No. PCT/IL2009/000275.

Communication Relating to the Results of the Partial International Search Dated May 19, 2009 From the International Searching Authority Re.: Application No. PCT/IL2009/000030.

Communication Relating to the Results of the Partial International Search Dated Sep. 23, 2008 From the International Searching Authority Re.: Application No. PCT/IL2008/000324.

International Preliminary Report on Patentability Dated Jun. 5, 2009 From the International Preliminary Examining Authority Re.: Application No. PCT/IL2008/000325.

International Preliminary Report on Patentability Dated Sep. 24, 2009 From the International Bureau of WIPO Re.: Application No. PCT/IL2008/000324.

International Preliminary Report on Patentability Dated Aug. 26, 2010 From the International Bureau of WIPO Re. Application No. PCT/IL2009/000030.

International Search Report and the Written Opinion Dated Jul. 12, 2010 From the International Searching Authority Re.: Application No. PCT/IL2009/000275.

International Search Report Dated Jul. 2, 2008 From the International Searching Authority Re.: Application No. PCT/2008/000325.

International Search Report Dated Sep. 2, 2009 From the International Searching Authority Re.: Application No. PCT/IL2009/000030.

International Search Report Dated Jul. 13, 2009 From the International Searching Authority Re.: Application No. PCT/IL2009/000378.

International Search Report Dated Dec. 17, 2008 From the International Searching Authority Re.: Application No. PCT/IL2008/000324.

Written Opinion Dated Jul. 2, 2008 From the International Searching Authority Re.: Application No. PCT/Il2008/000325.

Written Opinion Dated Sep. 2, 2009 From the International Searching Authority Re.: Application No. PCT/IL2009/000030.

Written Opinion Dated Jul. 13, 2009 From the International Searching Authority Re.: Application No. PCT/IL2009/000378.

Written Opinion Dated Dec. 17, 2008 From the International Searching Authority Re.: Application No. PCT/IL2008/000324.

International Preliminary Report on Patentability Dated Sep. 23, 2010 From the International Bureau of WIPO Re. Application No. PCT/IL2009/000275.

International Preliminary Report on Patentability Dated Oct. 21, 2010 From the International Bureau of WIPO Re. Application No. PCT/IL2009/000378.

Official Action Dated Oct. 24, 2011 From the US Patent and Trademark Office Re. U.S. Appl. No. 12/530,482.

Communication Relating to the Results of the Partial International Search Dated Apr. 12, 2010 From the International Searching Authority Re.: Application No. PCT/IL2009/000275.

Official Action Dated Mar. 21, 2012 From the US Patent and Trademark Office Re. U.S. Appl. No. 12/530,482.

Official Action Dated Dec. 28, 2012 From the US Patent and Trademark Office Re. U.S. Appl. No. 12/936,217.

Official Action Dated Mar. 14, 2013 From the US Patent and Trademark Office Re. U.S. Appl. No. 12/530,480.

(56) References Cited

OTHER PUBLICATIONS

Official Action Dated Mar. 26, 2013 From the US Patent and Trademark Office Re. U.S. Appl. No. 12/867,259.
Sony "PlayStation® Portable. Instruction Manual PSP-1001 K", Sony®, p. 1-49, Appendix i-iv, 2005.

Notice of Allowance Dated Jun. 10, 2013 From the US Patent and Trademark Office Re. U.S. Appl. No. 12/867,259.
Official Action Dated Jun. 11, 2013 From the US Patent and Trademark Office Re. U.S. Appl. No. 12/936,217.

* cited by examiner

SYSTEMS AND METHODS FOR COMMUNICATION

RELATED APPLICATIONS

This Application is a National Phase of PCT Patent Application No. PCT/IL2009/000275 having International filing date of Mar. 11, 2009, which claims the benefit of U.S. Provisional Patent Application No. 61/064,542 filed on Mar. 11, 2008. The contents of the above Applications are all incorporated herein by reference.

FIELD AND BACKGROUND OF THE INVENTION

The present invention, in some embodiments thereof, relates to toys and, more particularly, but not exclusively, to toys communication, such as a communication between a toy and a client terminal.

Children's toys in the form of traditional dolls, puppets, stuffed animals and the like have been around for centuries and are an enduring favorite among children—particularly among toddler-age children. A doll, stuffed animal or another similar toy can provide a much-needed imaginary friend, a pet or a playmate for a child who occasionally gets lonely or bored and also can be used as learning aids. For example, such playmate toys can also help a child to express himself or herself and to learn basic social skills that foster personality development and overall social adjustment.

During the last years interactive toys which designed to communicate with the child and/or with other toys have been developed. Such interactive toy, which may be in the form of a stuffed-animal, a doll or an action figure and may include a wireless communication/identification unit for communicating with toys in the proximity thereof.

Examples for interactive toys are provided in U.S. Pat. Nos. 6,773,322; 6,773,344; 6,290,566; 6,206,745; 6,022,273; 6,075,195 and 5,752,280 to Gabai et al. They are further described in U.S. Pat. No. 7,066,781 to Weston, U.S. Pat. No. 7,217,192 to Nishiyama, and U.S. Pat. No. 7,131,887 to Hornsby et al.

These interactive toys may be connected, via a designated wireless link, such as Wi-Fi connection or infrared (IR) connection, or via a network connection, such as local area network (LAN) connection, to a computing device, such as a home computer, with respective wireless abilities, an Interactive Television (TV) set-top box or a wireless router which provides Internet connectivity for the toy.

SUMMARY OF THE INVENTION

According to an aspect of some embodiments of the present invention there is provided a method for using a toy for communicating with a client terminal. The method comprises a) encoding at least one interacting information as at least one flickering control instruction and b) using a toy element having a light emitting unit for emitting light according to the at least one flickering control instruction, thereby transmitting the interacting information to a client terminal. The client terminal is configured for capturing the emitted light using an image capturing device and decoding the at least one interacting information therefrom.

Optionally, the toy element having a structure indicative of the at least one interacting information.

More optionally, the toy is a member of a group consisting of a plurality of toys, each the toys being indicative of different interacting information.

Optionally, the method further comprises reading a unique machine-readable representation of the interacting information from a label before the a).

More optionally, the client terminal is a personal computer, the interacting information comprises a member selected from a group consisting of: a basic operation, an operating system operation, and a preprogrammed operation, the client terminal is configured for executing the member after the b).

According to an aspect of some embodiments of the present invention there is provided a method for using a reading device for communicating with an appliance. The method comprises a) using the reading device for reading a unique machine-readable representation associated with an appliance function and a visible indication associated with the function, b) encoding at least one instruction indicative of the appliance function, and c) wirelessly transmitting the at least one instruction to the appliance, thereby instructing the appliance to execute the appliance function.

Optionally, the at least one instruction is a flickering control instruction, the transmitting comprising emitting light according to the flickering control instruction.

Optionally, the appliance is selected from a group consisting of a personal computer (PC), a television (TV), a digital versatile disc (DVD), a compact disk (CD), a set-top box, a game console, a media center console, a mobile telephone, a heater, an air conditioner, a garage door, and a kitchen appliance.

Optionally, the wirelessly transmitting emulates a remote control transmission.

Optionally, the visible indication is a graphic icon depicting the function.

Optionally, the method further comprises presenting a challenge to a user before the a), wherein the appliance function is directing the appliance to present a reaction to the challenge.

Optionally, the reading comprises reading the unique machine-readable representation from a menu comprising a plurality of machine-readable representations associated with a plurality of appliance functions.

Optionally, the plurality of machine-readable representations associated with keys of a keyboard, the instructing comprises typing respective the keys.

Optionally, the appliance is at least one of a television, a cellular phone and a set top box, the appliance function is selected from a group consisting of: changing a television channel, turning on the television, turning off the television, increasing the volume of the television, playing in an interactive gaming session, and participating in an interactive learning session.

Optionally, the appliance is a player of a media comprising a plurality of tagged segments; the appliance function is selecting a tagged segment to be played by the player.

According to an aspect of some embodiments of the present invention there is provided a toy for communicating with a client terminal. The toy comprises a body, a user interface configured for allowing a user to select at least one interacting information, a memory configured for hosting at least one flickering control instruction associated with the at least one interacting information, and a light emitting unit configured for instructing a client terminal having an image capturing device by emitting light according to the at least one flickering control instruction toward the image capturing device.

Optionally, the body is a structure selected from a group consisting of: a stuffed-animal doll, a human-like doll, a toy shaped doll, and an action figure doll.

Optionally, the user interface comprises a voice recording unit configured intercepting an audio signal representing the interacting information.

Optionally, the user interface is a sensing unit configured for reading a machine-readable representation of the interacting information from the label.

Optionally, the image capturing device is a webcam.

More optionally, the client terminal is connected to a remote server via a computer server, the client terminal being configured for forwarding the instructions to the client terminal.

According to an aspect of some embodiments of the present invention there is provided a game kit for allowing a player to use a toy for communicating with a client terminal. The game kit comprises a toy communication module configured for execution on a client terminal associated with an image capturing device and at least one toy element configured for emitting at least one sequence of lights indicative of at least one interacting information toward the image capturing device. The toy element and the toy communication module are configured to allow a user to establish an interactive session with the client terminal.

Optionally, the client terminal is configured for establishing the interactive session between a network node and the user via a computer network.

Optionally, the image capturing device is a webcam.

Optionally, the at least one toy element comprises a plurality of toy elements each having a body structure indicative of respective the at least one interacting information.

According to an aspect of some embodiments of the present invention there is provided a method for transmitting playing information from a first toy to a second toy. The method comprises allowing a physical contact between the first and second toys, vibrating the first toy according to playing information, detecting the vibrations by using the second toy, and obtaining the playing information from the detected vibrations.

Optionally, the method further comprises vibrating the second toy according to the detected vibrations.

Optionally, the obtaining comprises forwarding the detected vibrations to a client terminal, further comprising using the client terminal for reacting to the playing information.

Optionally, the physical contact is established via a mediating element, wherein the vibrating comprises vibrating the mediating element by vibrating the first toy, the detecting comprises detecting the physical contact vibrations.

Unless otherwise defined, all technical and/or scientific terms used herein have the same meaning as commonly understood by one of ordinary skill in the art to which the present invention pertains. Although methods and materials similar or equivalent to those described herein can be used in the practice or testing of embodiments of the present invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the present invention can involve performing or completing selected tasks manually, automatically, or a combination thereof. Moreover, according to actual instrumentation and equipment of embodiments of the method and/or system of the present invention, several selected tasks could be implemented by hardware, by software or by firmware or by a combination thereof using an operating system.

For example, hardware for performing selected tasks according to embodiments of the present invention could be implemented as a chip or a circuit. As software, selected tasks according to embodiments of the present invention could be implemented as a plurality of software instructions being executed by a computer using any suitable operating system. In an exemplary embodiment of the present invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the present invention are herein described, by way of example only, with reference to the accompanying drawings. With specific reference now to the drawings in detail, it is stressed that the particulars shown are by way of example and for purposes of illustrative discussion of embodiments of the present invention. In this regard, the description taken with the drawings makes apparent to those skilled in the art how embodiments of the present invention may be practiced.

In the drawings.

DESCRIPTION OF SPECIFIC EMBODIMENTS OF THE INVENTION

Figure 1:
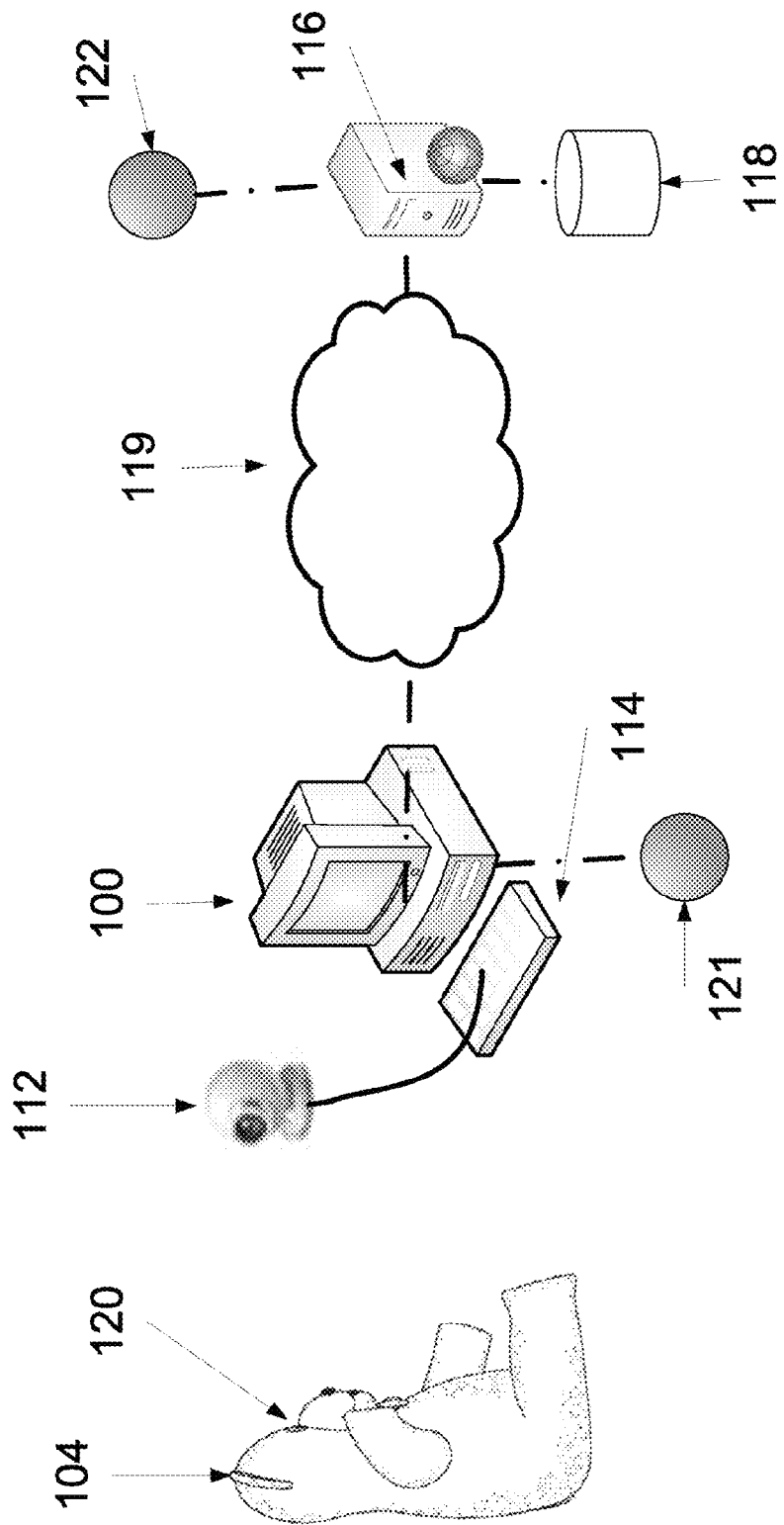
FIG. 1 is a schematic illustration of an exemplary toy that communicates with an exemplary client terminal which is connected to an exemplary image capturing device, according to some embodiments of the present invention.

The present invention, in some embodiments thereof, relates to toys and, more particularly, but not exclusively, to toys communication, such as a communication between a toy and a client terminal.

The present invention, in some embodiments thereof, provides a toy for communicating with a client terminal, such as a personal computer, which is connected to an image capturing device, such as a webcam. The toy encodes interacting information as flickering control instructions and signals, using a light emitting unit, such as a light emitting diode (LED), the interacting information to the client terminal, either directly or via a network. As used herein interacting information means one or more operational instructions, operating system (OS) instructions, playing information, such as a selection, a move, a question, an answer, and a learning reaction.

The client terminal captures the emitted light as an input, using an image capturing device, such as a webcam, and decodes the interacting information therefrom. Optionally, the decoded interacting information is used for animating a figure which is displayed on the screen of the client terminal. Optionally, the client terminal is connected to a network node, such as a remote server, and the decoded interacting information is forwarded thereto. In such an embodiment, the toy allows the user to communicate online with an application that is managed by the network node and/or with an application that is installed on a remote computer, such as a computer which is operated by a parent of the user.

The present invention, in some embodiments thereof, provides a system for using a toy with a reading element, for example as described in Provisional Patent Application Nos. 60/906,228 filed on Mar. 12, 2007 and 60/906,227 filed on Mar. 12, 2007, which are incorporated herein by reference, to control a client terminal, such as a television (TV), a digital versatile disc (DVD) player, a compact disk (CD) player, a set-top box, a game console, a media center console and a mobile telephone. For example, toys may used for reading labels, optionally from a user friendly menu, which are indicative to a certain function of the client terminal, for example a certain TV channel or a certain TV set function, and the toy transmits respective information to the client terminal, optionally using a transmitting element that is similar to the transmitting element of the remote control thereof. In such an embodiment, the toy with the reading element may have an Infrared (IR) element that imitates the operation of a remote control.

In some embodiments of the present invention, the toy with the reading element is used for operating basic operations in a personal computer, such as open a Microsoft Explorer™, open a Microsoft Messenger™, shutdown the personal computer, etc. The toy may be configured by a user for operating certain operation, such as connect to a specific contact via an Instant Message (IM) program and browse to a favorite website. In such an embodiment, the communication may be via a webcam that is connected to the personal computer, optionally as outlined above and described below.

The present invention, in some embodiments thereof, provides a method for transmitting playing information among toys. The method is used for allowing a communication between toys which are positioned in a physical contact and/or a physical proximity. First, one of the toys vibrates according to certain playing information, for example information that is inputted by a user. Then, the vibrations are detected by one or more other toys that obtain the playing information from the detected vibrations. Such a method allows the emulation of a communication session between toys. One toy vibrates and the other reacts and so on and so forth, as further described below.

Reference is now made to FIG. 1, which is an exemplary toy system 100 according to some embodiments of the present invention. The system 100 includes one or more toys, for example as shown at 104. Optionally, the one or more toys are designed as an enduring, traditional form of stuffed animals, such as a teddy bear 104, a doll, a dog, or as molded plastic toys, such as a toy robot, a toy statue, an action figure or a like. The toy 104 comprises a signaling unit that is designed to encode interacting information and to signal the encoded interacting information via a light emitting unit, such as a LED, optionally as described below.

The System 100 also includes a client terminal 114 such as a personal computer (PC), a workstation, a laptop. The toy 104 communicates with the client terminal 114 by light signaling. The client terminal 114 is connected to an image capturing device 110, such as a WEB-camera 112 that captures the light that is emitted by the toys 104. Optionally, the client terminal 114 is a mobile phone and the image capturing device 110 is an integrated camera, such as a complementary metal oxide semiconductor (CMOS)—based and/or charge coupled device (CCD) based camera.

Optionally, the client terminal 114 hosts a toy communication module 121 which is designed for decoding the interacting information from the intercepted singling. Optionally, the client terminal 114 networks, via a computer network 119, the captured blinking and/or the decoded interacting information to a toy communication module 122 that is installed on one or more remote network nodes such as remote servers 116 with a database 118. As the communication between the toy 104 and the client terminal 114 may be performed using a common webcam or a common mobile phone camera the user does not have to connect a designated hardware to the client terminal 114. The toy 104 and an application that may be installed on the client terminal 114 or accessed via the computer network 119 optionally allows the user to establish an interactive game session and/or a learning session.

It should be noted that as the toy 104 is used for sending instructions to applications which are installed and/or accessed by client terminals with relatively high computational power, such as personal computers and/or server, an interactive session with graphics, voice and/or other multimedia functions may be established without requiring the utilization of a toy with strong computational abilities. In such an embodiment, the computational power of the toy 104 may be relatively low as the computation of most of the playing and/or learning session that is established using the toy 104 and the client terminal 114 are performed by the client terminal 114.

Optionally, the toy 104 comprises a microphone that is connected to an audio processing module for allowing the toy 104 to receive instructions from the client terminal 114. In such an embodiment, the toy 104 and the client terminal 114 may establish an interactive playing session in which the toy 104 may react to voice instructions which are received from the client terminal 114. Optionally, the audio processing module is connected a memory that hosts a plurality of records, each associated with a certain interacting information. In use, the client terminal encodes interacting information in an audio track, audible or inaudible to a human user, and plays it. The audio processing module records an analog signal that represents the played segment and decodes the interacting information therein. In such an example, the analog audio signal may be forwarded to an audio processor module that converts the analog signal to a digital signal for processing. After processing, the digital signal is matched with the records in the storage and used for triggering a reaction of the toy, for example a set of blinking, as described below, an activation of rotating and/or actuating units etc. Because this method of employing audio processor module requires multiple conversions between analog and digital formats, thereby increasing complexity, cost, and power consumption of such a toy, the personal computer may encode simple and/or short audio signals. Optionally, the communication between the toy 103 and the client terminal 114 allows the toy 104 to use the processor of the client terminal 114 for performing computational tasks. In such an embodiment, the toy 103 may encode computational instructions which are performed by the processor of the client terminal 114.

Figure 2:
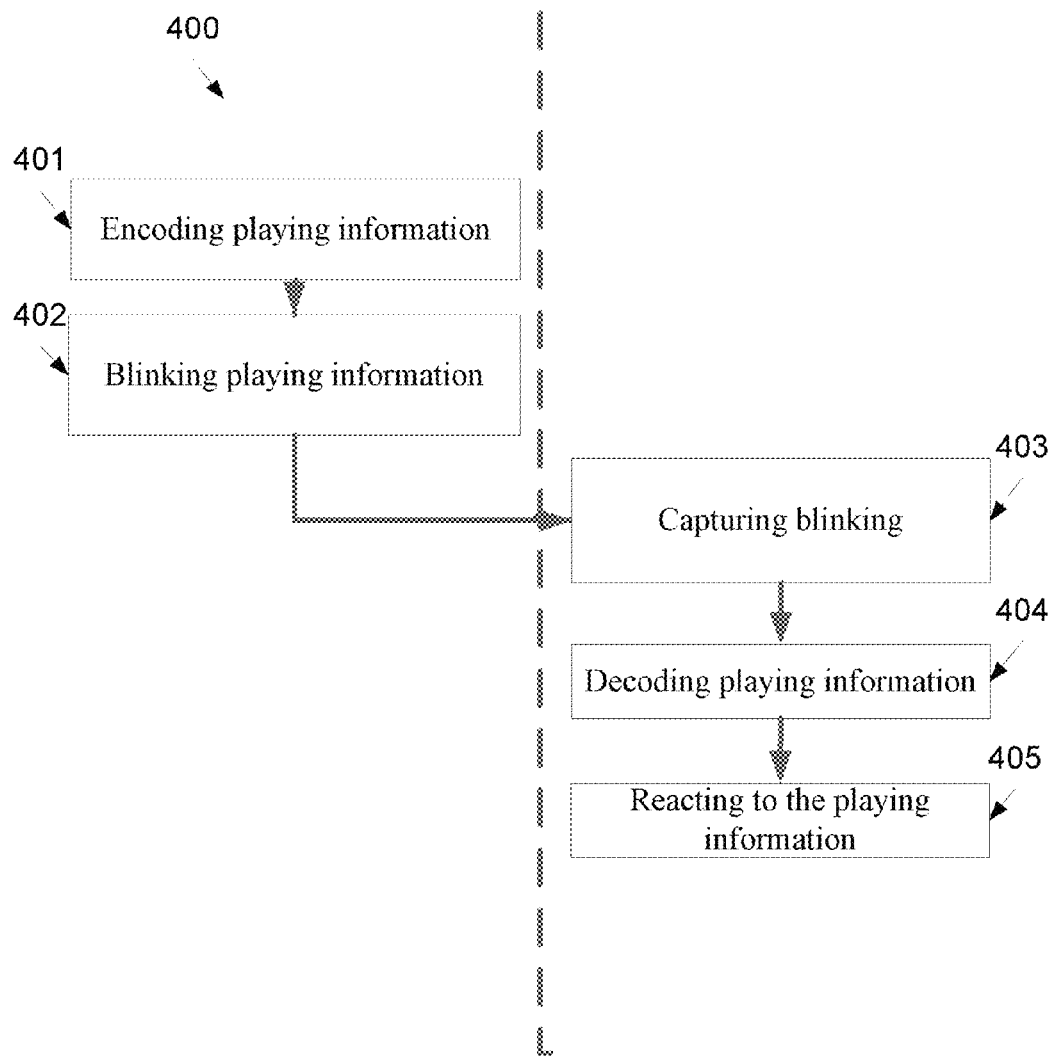
FIG. 2 is a flowchart of functions which are performed by the toy and the client terminal of FIG. 1 during a playing and/or learning session, according to some embodiments of the present invention.

Reference is now also made to FIG. 2, which is a flowchart 400 depicting the functions which are performed by the toy 104 and the client terminal 114 during an exemplary playing and/or learning session, according to some embodiments of the present invention. A user, such as a child, may interact with the toy 104. Optionally, the toy 104 has user interface (UI), such as a keypad or a joystick, that allows the user to instruct the toy 104 or any other receiving unit, such as a microphone, optionally as described above.

Accordingly, as shown at 401, 402 the toy 104 may initiates a learning and/or playing session with the client terminal 114 by encoding and blinking respective interacting information. As further described above, the client terminal 114 captures the interacting information 403, decodes the interacting information therefrom 404, and react with a respective action, for example by running a software, animating a figure on its display, playing a video clip, playing an audio clip, etc.

Optionally, the client terminal 114 provides instructions and/or guidance to the user. As described above, the toy 104 uses optionally has limited computing power. Accordingly, the need to protect processors and/or memory from misuse by the user in such a toy 104 may be reduced. Also, the power used by the toy 104 can be reduced, prolonging battery life of the toy 104.

According to some embodiments of the present invention, the toy 104 may help a user with reading and/or learning. Optionally, the toy 104 has a UI that allows the user to select a label with literal and/or pictorial symbols from labels (not shown) which are attached to the toy 104 and push or pull such labels. In such an embodiment, the toy 104 encodes interacting information corresponds with the selected label as at least one flickering control instruction and activates one or more of the light emitting units 120 for emitting light that represents the encoded interacting information toward client terminal 114. Now, the client terminal 114 communicates with the toy 104, so that the toy 104 may output the name of a symbol and/or a name of an animal or a plant, etc. In this sense, the toy 104 may appear to be useful to a child's learning. In that case, a display (not shown) may also be incorporated into toys 104 to present the user with the words being read by the toy 104. Therefore, the toy 104 may aid in the learning process of the user by teaching the user to read and/or learn new information and/or ability.

According to some embodiments of the present invention, the toy 104 may be capable of holding intelligent conversation with the user by using the computing power of client terminal. In that case, the user may talk and the toy 104 captures the speech, encodes it, optionally using the aforementioned audio processing module, and transmits it by blinking to client terminal 114. The client terminal 114 then plays a media file and/or animation that response to user. Thus, if the user asks a question, the toy 104 may cause the client terminal to respond with a related answer. Optionally, the client terminal 114 adjusts the playing session according to the user answers and/or response time.

In another example, the toy 104 may facilitate translation of words spoken by a user. For example, a user may speak to the toy 104, which captures the speech and communicates the captured speech to the client terminal 114, optionally as described above.

According to some embodiments of the present invention, the user say the words "Thank you" to toy 104 that captures the phrase and communicates the captured phrase to client terminal 114 that parses it and identifies a translation thereto. The client terminal 114 may communicate the translation back to the toy, and toy 104 may output the translations by, for example, responding with "Danke" means "thank you" in German.

Optionally, the client terminal 114 is designed to identify different toys. In such an embodiment, the user is provided with a kit that includes a plurality of toys, each having a different blinking pattern. In such a manner, the toy communication module 121 that is installed on the client terminal 114 and/or on a remote server, as described above, may react according to the toy which is presented thereto. For example, the user receives a kit of toys, each shaped as a different animal and the toy communication module 121 reacts in a manner reflects the animal that the blinking thereof is captured by the image capturing device 112. Optionally, the image capturing device 112 captures a sequence of images of a number of blinking toys. As different toys may have different blinking patterns the decoding of such an image may be used for identifying a combination of toys. For example, the user presents the image capturing device 112 with a number of toys simultaneously, such as a lion toy and a sheep toy, and the image capturing device may simultaneously capture the a combination of blinking and decode it, and play a respective media file, for example of an animation of a lion that interacts with a sheep. Optionally, the relative location of the blinking in the captured images is identified. In such a manner, the toy communication module 121 may react according to the positioning of the toys, for example according to the order thereof. For example, the user may hold a toy having a body that is shaped as a dog and a toy having a body which is shaped as a bone and the toy communication module 121 may play a media file of barking and/or of wailing according to the distance between them.

According to some embodiments of the present invention, the toy communication module 121 may include an image processing sub-module for recognition of faces, objects, colors, numbers, and the like. Optionally, the toy communication module 121 may be configured to identify the face of the user in the captured image. The toy communication module 121 may use the recognition for emulating an interaction with the user, for instance, by playing the name of the user. In an exemplary embodiment, the toy 104 is used for teaching the user to recognize shapes, count objects, and/or becoming familiar with colors and alike. Optionally, the toy communication module 121 is used for managing a playing session between the user and the toy 104. In such an embodiment, the relative location of the user in relation to the toy 104, a relative location of one or more of her limbs in relation to the toy 104, and/or a gesture that is performed toward and/or with the toy 104 are identified by analyzing the images which are captured by the image capturing device 112 and used by the toy communication module 121 to trigger a certain reaction.

For example, the user may reach her hand toward a blinking toy with a body that is shaped as a dog; the toy communication module 121 that identifies the gesture reacts by playing a related media file, such as barking noise audio file.

According to some embodiments of the present invention, an interaction between a user and a toy, as shown at 104, may be proactive and/or reactive. For example, the toy 104 may serve as an alarming module, instructing the toy communication module 121 to play a media file that informs the user that it is time to get bed, do homework, and the like. The toy 104 may also proactively remind a user of the day's appointments, birthdays of friends or relatives and alike. Thus, first output may be provided, which is responsive to input to the toy, and client terminal 114 can be programmed to proactively cause the toy 104 to output second output to a user, e.g., an alarm or reminder.

Figure 3:
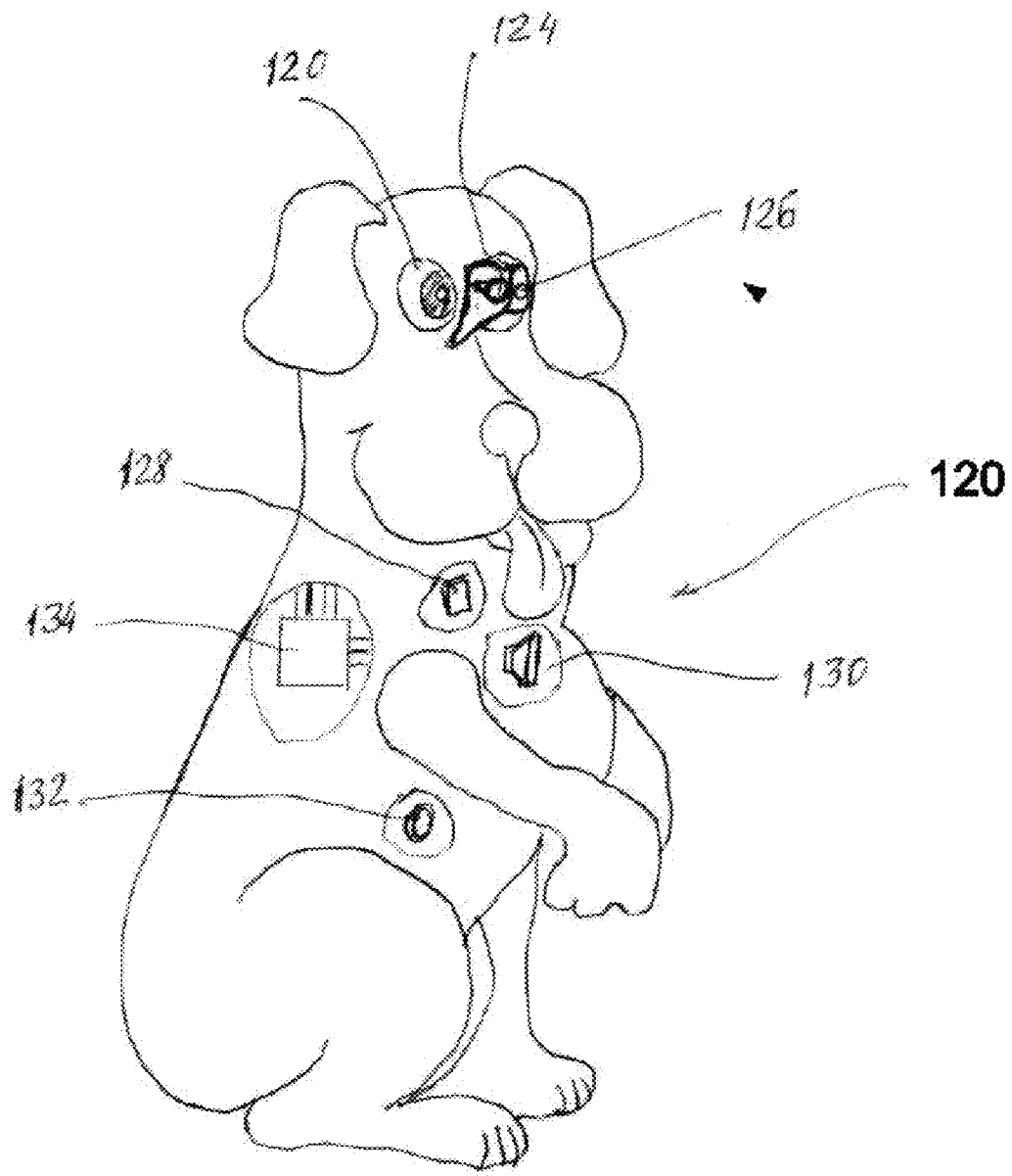
FIG. 3 depicts a schematic illustration of a toy for communicating with a client terminal computer, according to some embodiments of the present invention.

Reference is now also made to FIG. 3, which is a schematic illustration of an exemplary toy, according to some embodiments of the present invention. The toy 104 includes a body that is shaped as a dog, an light emitting unit 120 for blinking interacting information to the client terminal 114, a speaker 130 for communicating with the user, an audio voice unit 123, such as a microphone, for recording and/or receiving audio instructions, optionally, as described above, and a processor for processing visual and/or audio signals, according to some embodiments of the present invention.

Optionally, a button or other actuator (not shown) may be disposed on the toy 104 to turn on the microphone 132.

Optionally, sounds or images detected by the input device 128 may be locally processed by the processor 134 of the toy 104 in order to facilitate communication of the data to client terminal 114. Optionally, the processor 134 comprises a relatively simple controller.

Figure 4:
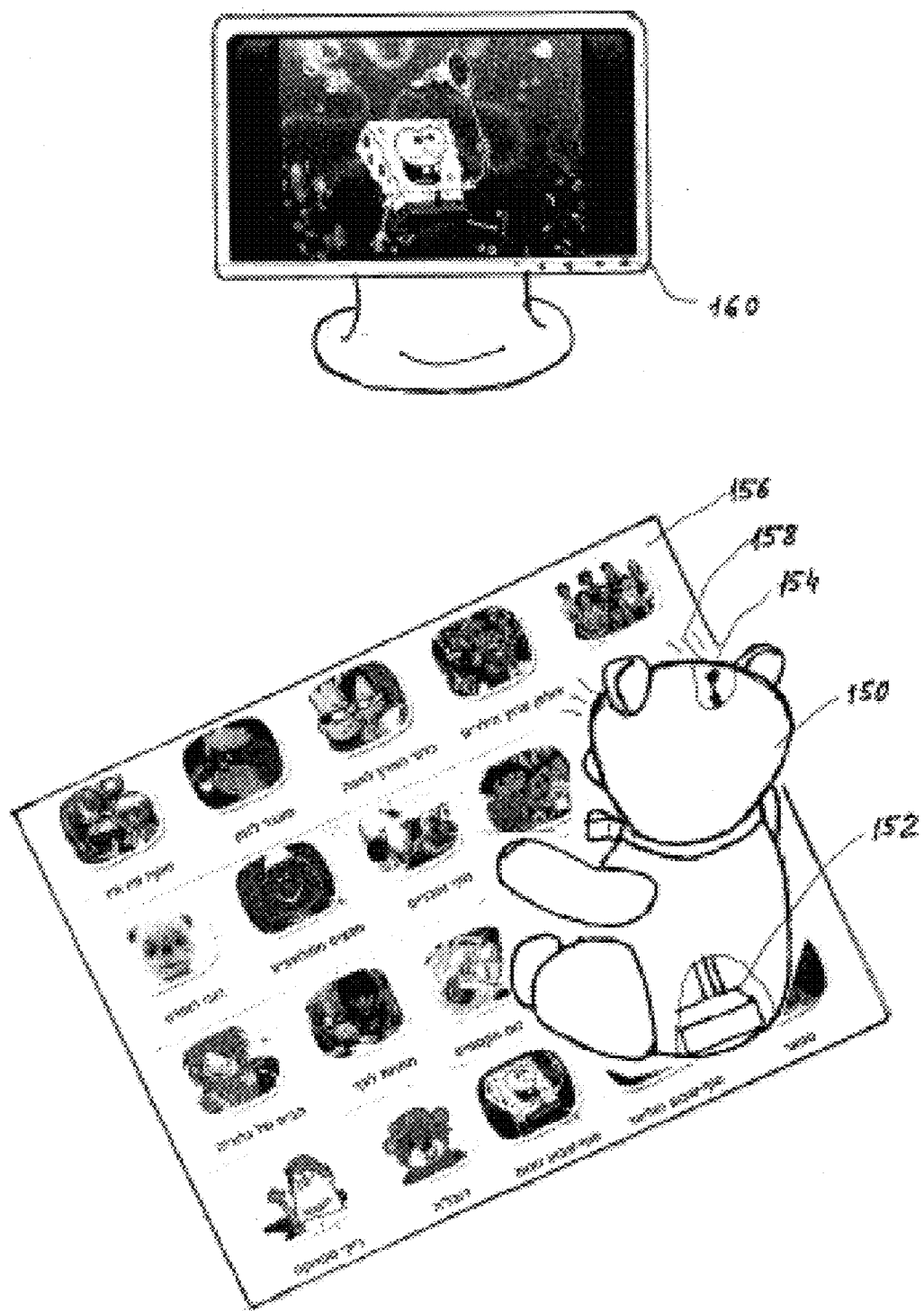
FIG. 4 is a schematic illustration of a toy that wirelessly communicates with a television set, according to some embodiments of the present invention.

Reference is now made to FIG. 4, which is a schematic illustration of a toy 150 that is used a remote control for operating an appliance 160, such as a TV, and a menu 156 that includes a plurality of labels, according to some embodiments of the present invention.

Figure 5:
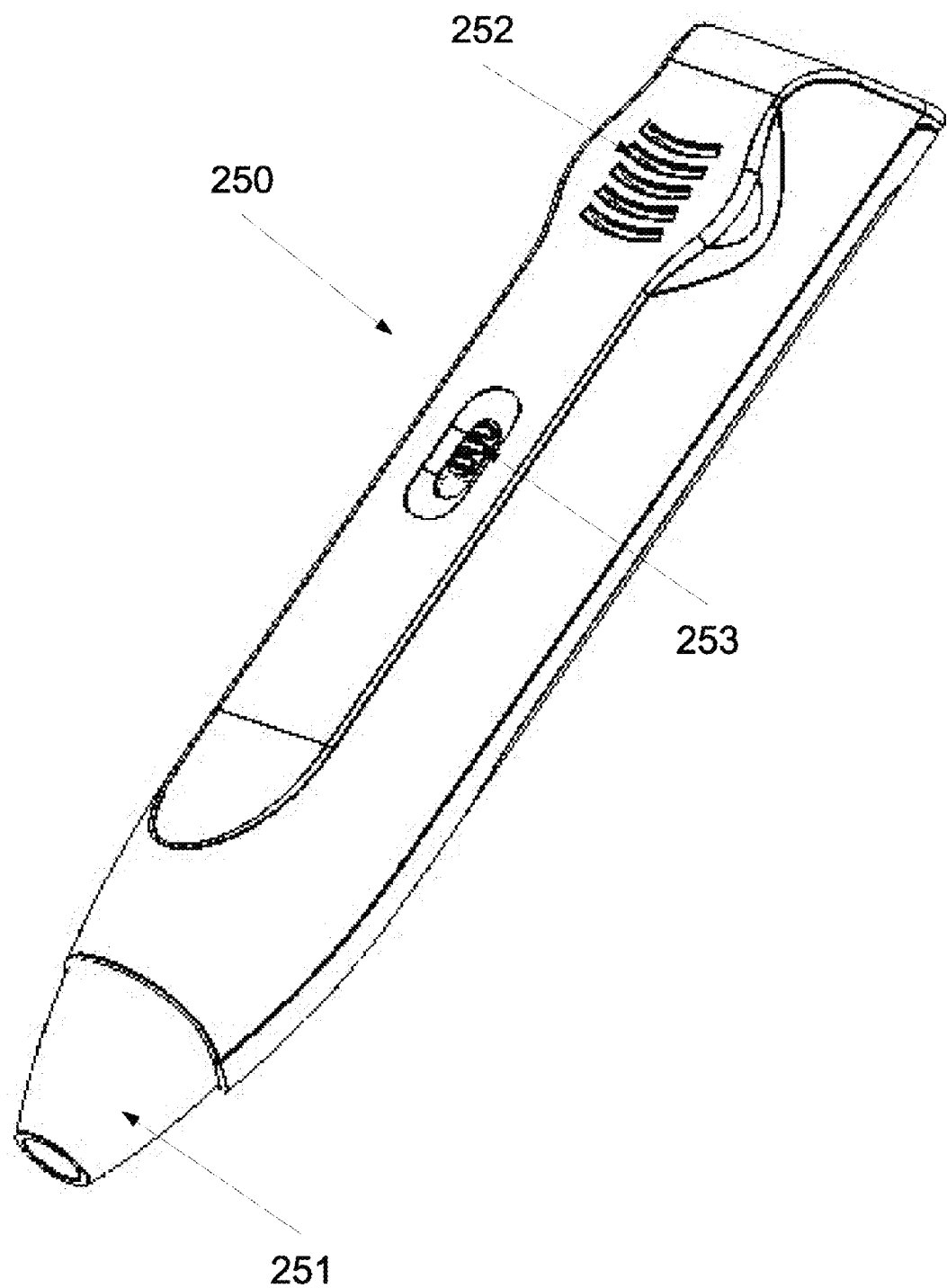
FIG. 5 is a schematic illustration of a reader device for wirelessly communicating with a television set, according to some embodiments of the present invention.

As outlined above, a toy, as shown at 150, or a reader device, as shown at 250 of FIG. 5, may be used for operating and/or interacting with the appliance and/or a client terminal, as shown at 114 above. The toy 150 or the reader device 250 comprises a sensing unit 152, 251 for reading a unique machine-readable representation of the interacting information from the label, a processing unit (not shown) for identifying the interacting information according to the representation and a transmitting unit 154, 252 for transmitting the interacting information to the appliance and/or the client terminal. Optionally, the reader device 250 is as described in Provisional Patent Application Nos. 60/906,228 filed on Mar. 12, 2007 and 60/906,227 filed on Mar. 12, 2007, which are incorporated herein by reference.

According to some embodiments of the present invention, the transmitting unit 154, 252 includes an IR and/or radio frequency (RF) transmitter for transmitting IR and/or RF signals to the appliance and/or the client terminal. The IR and/or RF transmitter transmits the IR and/or RF signals 158 that emulates the signals of the remote control of the appliance, for example the remote control of a TV, a CD player, a set top box, a DVD player, a heater, an air conditioner, and/or the remote control of a garage door and/or a kitchen appliance, such as a microwave oven. For example, a user may use a label of the menu that depicts a certain food product to select a set of instructions that instructs the microwave oven to heat the certain food product.

In some exemplary embodiments of the present invention, the IR and/or RF transmitter 154 transmits IR and/or RF signals of a remote control of a TV set. In such an embodiment, the menu 156 includes unique machine-readable representations of TV channels and/or TV functions. In use, the user uses the toy 150 or the reader device 250 for reading a certain unique machine-readable representation, such as a label, for example a label of FoxKids™ channel and/or "increase volume" and the IR and/or RF transmitter 154 emulates the action of the remote control of the TV and transmits IR and/or RF signals instruct the TV to zap to FoxKids™ channel and/or to increase the volume of the played media.

In some embodiments of the present invention, the toy 150 is used for navigating in a playing and/or learning show that is recorded on media with tagged segments, such as a CD, DVD, and tagged video on demand (VOD) program. The toy may be configured by a user for operating certain navigating between the tagged sections. The menu may include unique machine-readable representations of tagged section and the user may use the toy for selecting them and for instructing a console, such as a CD player, a DVD player, a gaming console, and/or a set-top box, to navigate to a respective segment. For example, the user may use a menu that includes machine-readable representations of segments of a learning DVD for navigation. The DVD optionally stores segments, each of a question, an answer, a reaction, a negative reaction, and/or hint for solving a question. The user uses the toy for selecting an answer from the menu and the toy instructs the DVD player to navigate to a segment that represents a respective reaction to the user selection. For example, the DVD player may play a segment that includes a video sequence of a figure asking a question, such as "how much is 2+4" and the user can use the toy to read one or more respective labels that represent her answer.

Optionally, the toy 150 and the menu 156 are used for allowing the user to participate in an interactive gaming session that is held on an interactive channel, such as Sky Gamestar™ or an interactive channel that is held on a cellular phone. In such an embodiment, the toy 150 and/or the menu 156 may be adjusted according to the content provider that provides the interactive gaming session in the interactive channel. For example, a content provider, such as Sky Gamestar™, may sell and/or provide the toy 150 and/or the menu 156 as a sale promoter for a certain interactive gaming session. When the user uses the toy 150 and/or the menu 156 for participating in an interactive gaming session, as described above, the content provider may charge the user and/or her parents for the participation in the interactive gaming session. Optionally, the user may print the menu 156 from a website and/or update the toy by connecting it to the client terminal.

Optionally, the toy has a universal serial bus (USB) socket and/or a memory card reader for reading content that is stored in memory cards. The memory cards are optionally solid-state electronic flash memory data storage devices, such as CompactFlash™ cards, SmartMedia™ cards, Memory Stick™ cards, Secure Digital™ cards, miniSD™ cards, and/or MicroSD™ cards. Optionally, the USB socket and/or the memory card reader allow the updating of the memory of the toy 150. Optionally, the toy 150 may host a file that stores the menu 150 and the user may connect the toy 150 to the computer for uploading the file and/or for printing the menu 156.

In some embodiments of the present invention, the toy communication module 121 allows the user to create a menu and to associate its labels with different transmissions. In such a manner, the user may adjust the toy 150 to operate a certain appliance and/or to activate a selected interactive gaming session in a predefined manner.

Reference is now also made, one again, to FIG. 1. According to some embodiments of the present invention, the transmitting unit 154 is the aforementioned light emitting unit and the communication is done by blinking interacting information to the client terminal 114, optionally, as described above with regard to the toy which is shown at 104. In some exemplary embodiments of the present invention, the transmitting unit 154 activates the light emitting unit to emulate basic computer actions, such as "start a program", "increase volume", "activate player", "open browser", "connect to the internet", "press enter", "press space", and the like. In some exemplary embodiments of the present invention, the menu 156 depicts an enlarged and/or decorated keyboard and the transmitting unit 154 activates the light emitting unit to emulate pressing respective keys of the emulated keyboard. In such an embodiment, the user may use the toy for learning how to use a keyboard and/or for recognizing the letters of the alphabet. Optionally, such an enlarged keyboard and a toy are used by short-sighted users that have difficulties to see the keys of a regular keyboard. Optionally, such the menu 156 and the toy 154 may be used for as input device that allows the user to type letters and/or emails is a client terminal, such as a mobile phone. In such an embodiment, the menu 156 includes unique machine-readable representations of basic functions and/or preprogrammed functions. In use, the user uses the toy 150 or the reader device 250 for reading a certain unique machine-readable representation, such as a label, for example a label of Microsoft Explorer™ and/or "FoxKids™ website" and the light emitting unit blinks accordingly a set of blinking that is recorded by the image capturing device 112 and decoded by the toy communication module 121, optionally as described above.

As described above, the toy 104 is configured to participate in a game session with a toy communication module that is installed on the remote server 116. In such an embodiment, the toy 104 may serve as an UI for interacting with remotely located client terminals which are connected to the network 119. In some embodiments of the present invention, the toy 104 reports information obtained from one or more remote network nodes, such as website servers. For example, a user may announce "What is the weather forecast for today?", press a respective button, and/or read a respective label using the sensing unit 152 and the toy 104 may blink with a respective blinking pattern to the toy communication module that accesses a respective website and/or database via the network 140 for acquiring the related data. Upon retrieving the local forecast, client terminal 114 supplies that information to the toy 104, which answers the user's question.

Figure 6:
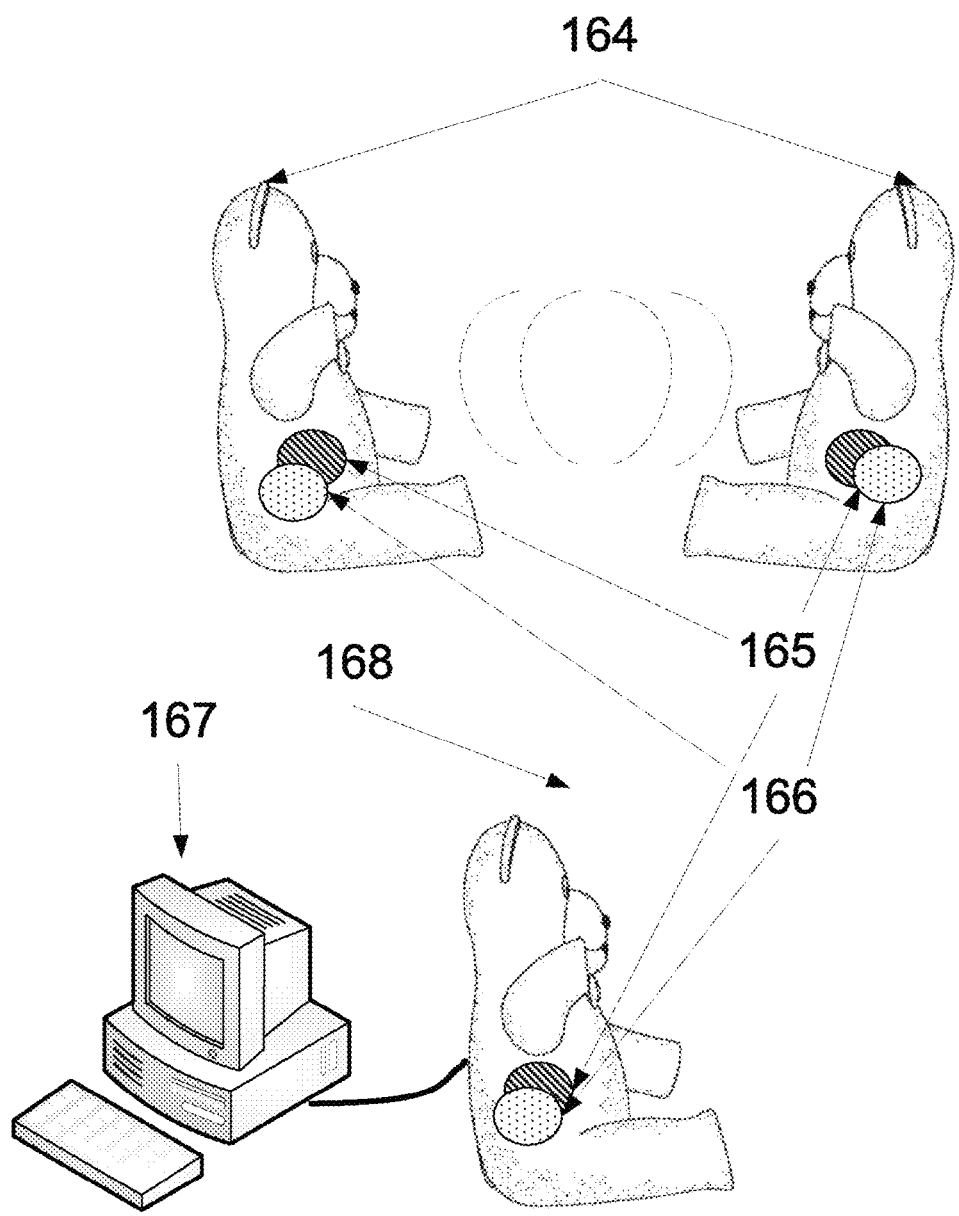
FIG. 6 is a conceptual diagram illustrating three toys that communicate by vibrating, according to some embodiments of the present invention.

Reference is now made to FIG. 6, which is a schematic illustration of three exemplary toys 164 which are designed to communicate by vibrating and a client terminal 167 that is connected to one of them, according to some embodiment of the present invention. In such embodiments, two or more toys may receive and transmit messages by vibrations. For example, one of the toys 166 may vibrate in a certain pattern for indicating on an emulated state, such as "hungry", and another toy may intercept the vibrations and decode them to reconstruct the emulated state which is encoded in the vibration. In such a manner, the intercepting toy may react to the vibrations by playing a related media file, actuating a certain element, and/or transmitting a respective message to the client terminal 167.

Optionally, each one of the toys 164 includes a body in the form of a stuffed-animal, a doll, an object, an action figure, or any other shape, a processor which is connected to a memory (not shown), one or more vibrating elements 165, such as a piezoelectric transducer based unit, and a vibration detection element 166 for detecting vibration patterns, such as piezoelectric devices and/or accelerometers responsive to localized motion. Example embodiments of other vibration elements 165 are described in U.S. Pat. No. 7,019,622, issued on Mar. 28, 2006, which is incorporated herein by reference.

In an exemplary embodiment, the memory comprises instructions for vibrating patterns of the vibrating elements which are associated with interfacing information. The processor activates the vibrating elements 165 according to the one or more of the vibrating patterns which are optionally selected by the user and/or as a response to a vibration that is detected by the vibration detection element 166. The vibrating patterns which are stored in the memory, and/or other vibrating patterns which are stored in the memory may be used for identifying interacting information that is encoded in the detected vibrations.

Optionally, the toy 164 is designed to communicate with a client terminal toy that is connected to a client terminal, as shown at 167, for example via a wired connection, such as a USB connection and/or Firewire™ connection, or wireless connection such as Wi-Fi™ and/or Bluetooth™ connection. In such a manner, the user may couple the toy 164 to the client terminal toy and transmit the interfacing information, such as described above, to a toy communication module, for example as described above with regard to FIG. 1, which is hosted on and/or accessed by the client terminal.

Optionally, the toy 164 is designed to communicate with another toy 164 via a mediating element, such as a table, a surface, and/or a designated element such as a vibratable toy element. In such an embodiment, the communicating toys can be remotely located from one another and to communicate by transferring vibration signals via the mediating element, Although the present invention has been described in conjunction with specific embodiments thereof, it is evident that many alternatives, modifications and variations will be apparent to those skilled in the art. Accordingly it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for using a toy for communicating with a client terminal, comprising:
   providing a toy element having a sensing unit, a processor, and a light emitting unit;
   using said sensing unit for reading a unique machine-readable representation of at least one interacting information from at least one label;
   encoding said at least one interacting information, using said processor, as at least one flickering control instruction; and
   using said light emitting unit for emitting light according to said at least one flickering control instruction, thereby transmitting said interacting information to a client terminal;
   wherein said client terminal is configured for capturing said emitted light using an image capturing device, decoding said at least one interacting information therefrom, and performing at least one function based on said at least one decoded interacting information.

2. The method of claim 1, wherein said toy element having a structure indicative of said at least one interacting information.

3. The method of claim 2, wherein said toy is a member of a group consisting of a plurality of toys, each said toys being indicative of different interacting information.

4. The method of claim 1, wherein said client terminal is a personal computer, said interacting information comprises a member selected from a group consisting of: a basic operation, an operating system operation, and a preprogrammed operation, said client terminal is configured for executing said member.

5. A toy for communicating with a client terminal, comprising:
- a body;
- a sensing unit which reads a unique machine-readable representation of at least one interacting information from at least one label;
- a memory configured for hosting at least one flickering control instruction associated with said at least one interacting information;
- a processor; and
- a light emitting unit configured for instructing a client terminal having an image capturing device to perform at least one function by emitting light according to said at least one flickering control instruction toward said image capturing device;
- wherein said processor operates said light emitting unit by encoding said light emitting unit based on said at least one interacting information.

6. The toy of claim 5, wherein said body is a structure selected from a group consisting of: a stuffed-animal doll, a human-like doll, a toy shaped doll, and an action figure doll.

7. The toy of claim 5, wherein said user interface comprises a voice recording unit configured intercepting an audio signal representing said interacting information.

8. The toy of claim 5, wherein said image capturing device is a webcam.

9. The toy of claim 7, wherein said client terminal is connected to a remote server via a computer server, said client terminal being configured for forwarding said instructions to said client terminal.

10. A game kit for allowing a player to use a toy for communicating with a client terminal, comprising:
- a toy communication module configured for execution on a client terminal associated with an image capturing device; and
- at least one toy element configured for reading a unique machine-readable representation of at least one interacting information from at least one label and emitting at least one sequence of lights indicative of said at least one interacting information toward said image capturing device;
- wherein said image capturing device captures said sequence of lights;
- wherein said toy communication module receives said captured sequence of lights from said toy element and decodes said sequence of lights to establish an interactive session with said client terminal;
- wherein said toy element and said client terminal are physically separated.

11. The game kit of claim 10, wherein said client terminal is configured for establishing said interactive session between a network node and said user via a computer network.

12. The game kit of claim 10, wherein said image capturing device is a webcam.

13. The game kit of claim 10, wherein said at least one toy element comprises a plurality of toy elements each having a body structure indicative of respective said at least one interacting information.

14. The method of claim 1, wherein said toy element and said client terminal are physically separated.

15. The method of claim 1, wherein said at least one label having at least one of a literal symbol and a pictorial symbol.

16. The method of claim 1, wherein said at least one label is printed.

* * * * *